May 19, 1964

A. SHASHATY ETAL 3,133,724

SAW MILLS

Filed Jan. 23, 1961

INVENTORS
ALEXANDER SHASHATY &
CLINTON K. BROWNING
BY
William D. Carothers
THEIR ATTORNEY

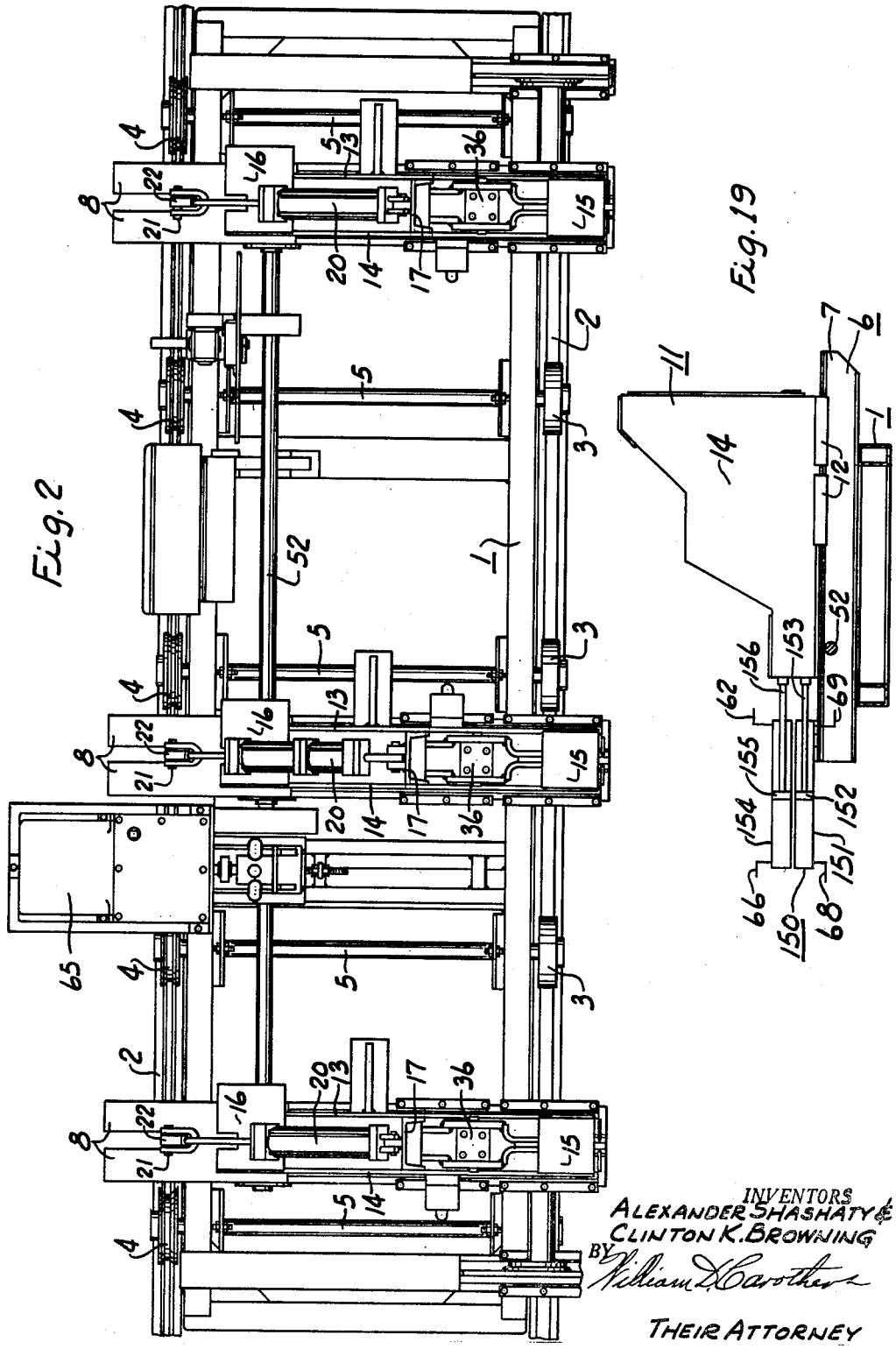

May 19, 1964  A. SHASHATY ETAL  3,133,724
SAW MILLS
Filed Jan. 23, 1961  11 Sheets-Sheet 3
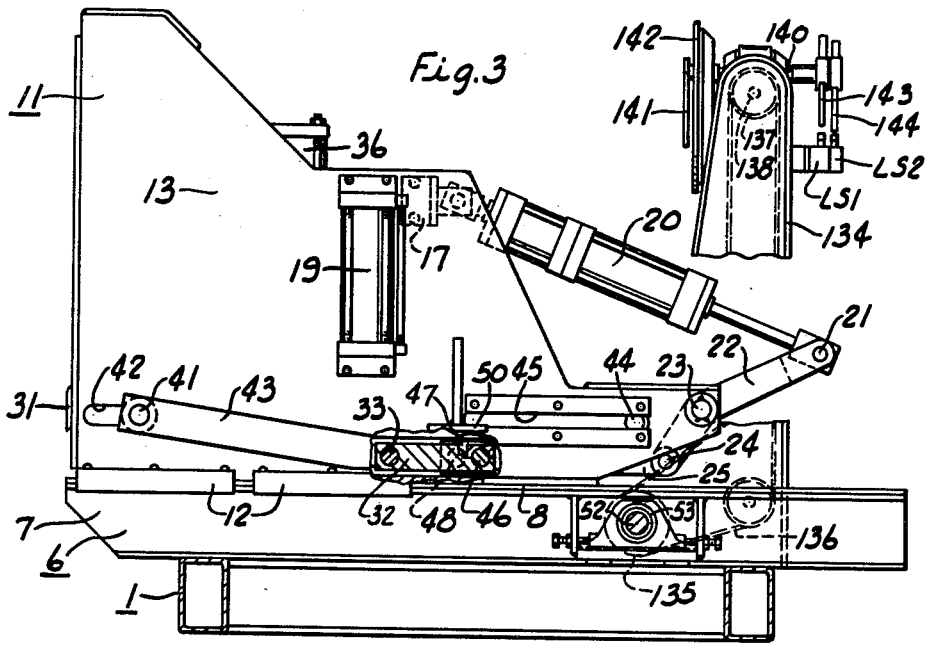
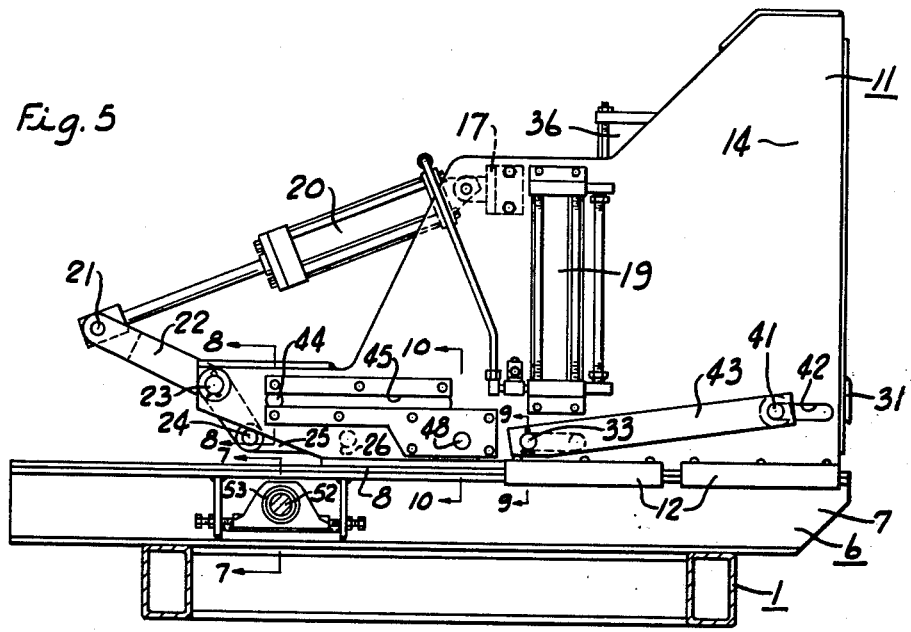
INVENTORS
ALEXANDER SHASHATY &
CLINTON K. BROWNING
BY
William D. Carothers
THEIR ATTORNEY

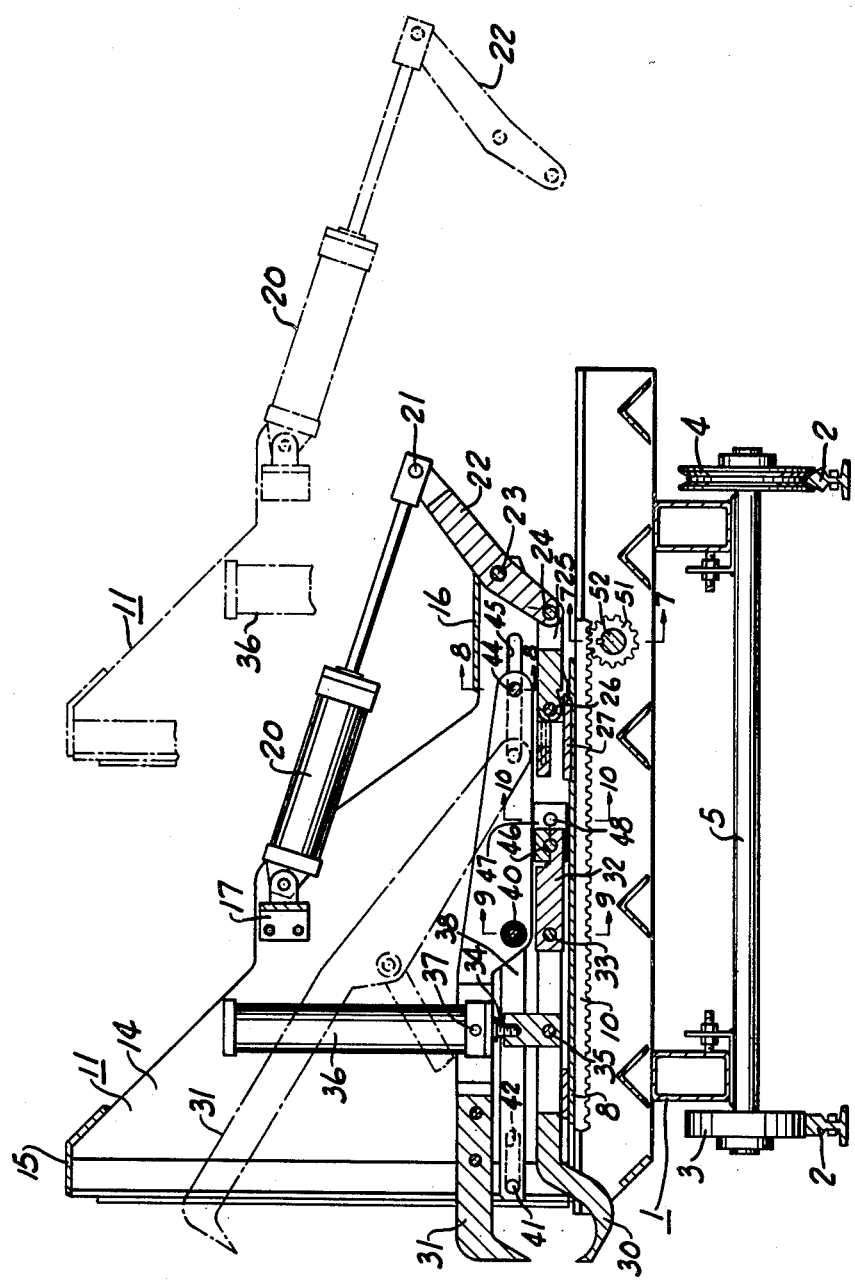

May 19, 1964 A. SHASHATY ETAL 3,133,724
SAW MILLS
Filed Jan. 23, 1961 11 Sheets-Sheet 5
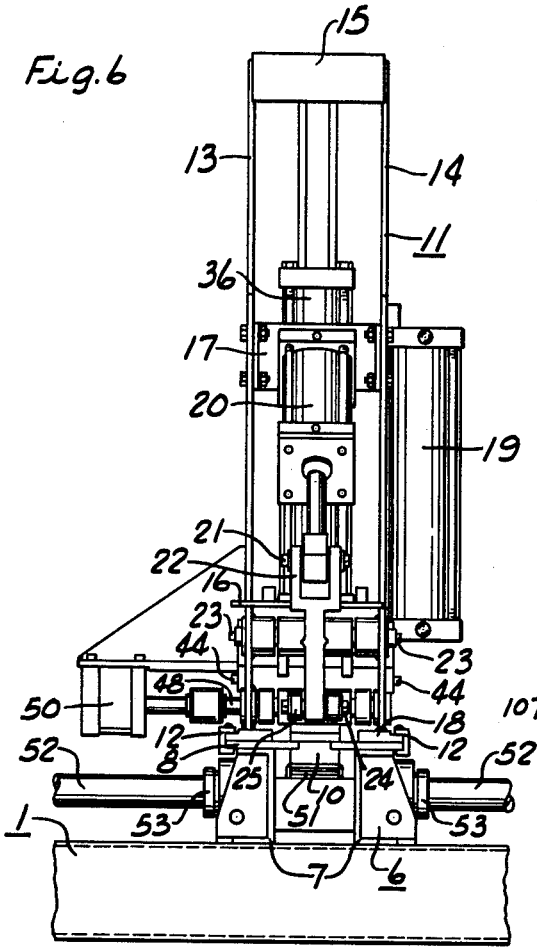
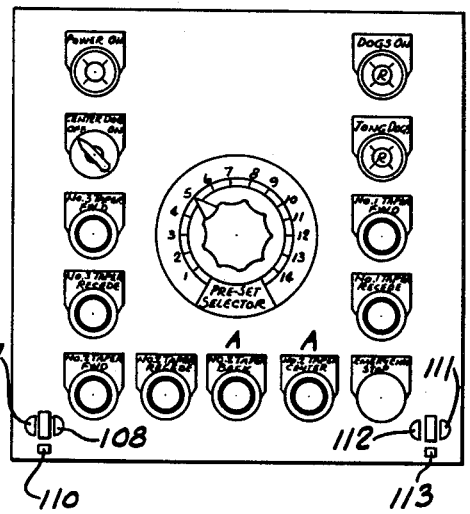
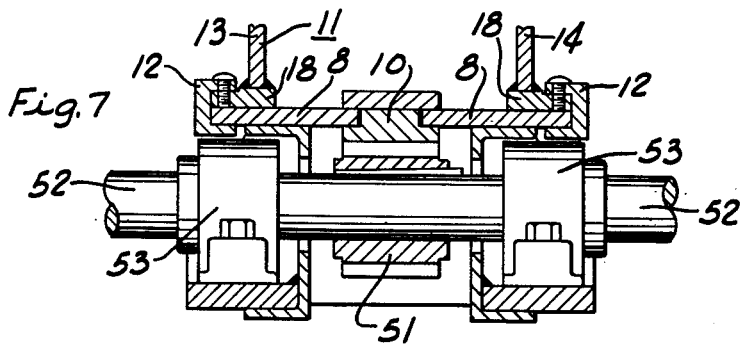
INVENTORS
ALEXANDER SHASHATY &
CLINTON K. BROWNING
BY
*William D. Carothers*
THEIR ATTORNEY May 19, 1964 A. SHASHATY ETAL 3,133,724
SAW MILLS
Filed Jan. 23, 1961 11 Sheets-Sheet 6

INVENTORS
ALEXANDER SHASHATY &
CLINTON K. BROWNING
BY
William D. Carothers
THEIR ATTORNEY May 19, 1964 A. SHASHATY ETAL 3,133,724
SAW MILLS
Filed Jan. 23, 1961 11 Sheets-Sheet 7

INVENTORS
ALEXANDER SHASHATY &
CLINTON K. BROWNING
BY
William D. Carothers
THEIR ATTORNEY May 19, 1964  A. SHASHATY ETAL  3,133,724
SAW MILLS
Filed Jan. 23, 1961  11 Sheets-Sheet 8

INVENTORS
ALEXANDER SHASHATY &
CLINTON K. BROWNING
BY
William D. Carothers
THEIR ATTORNEY

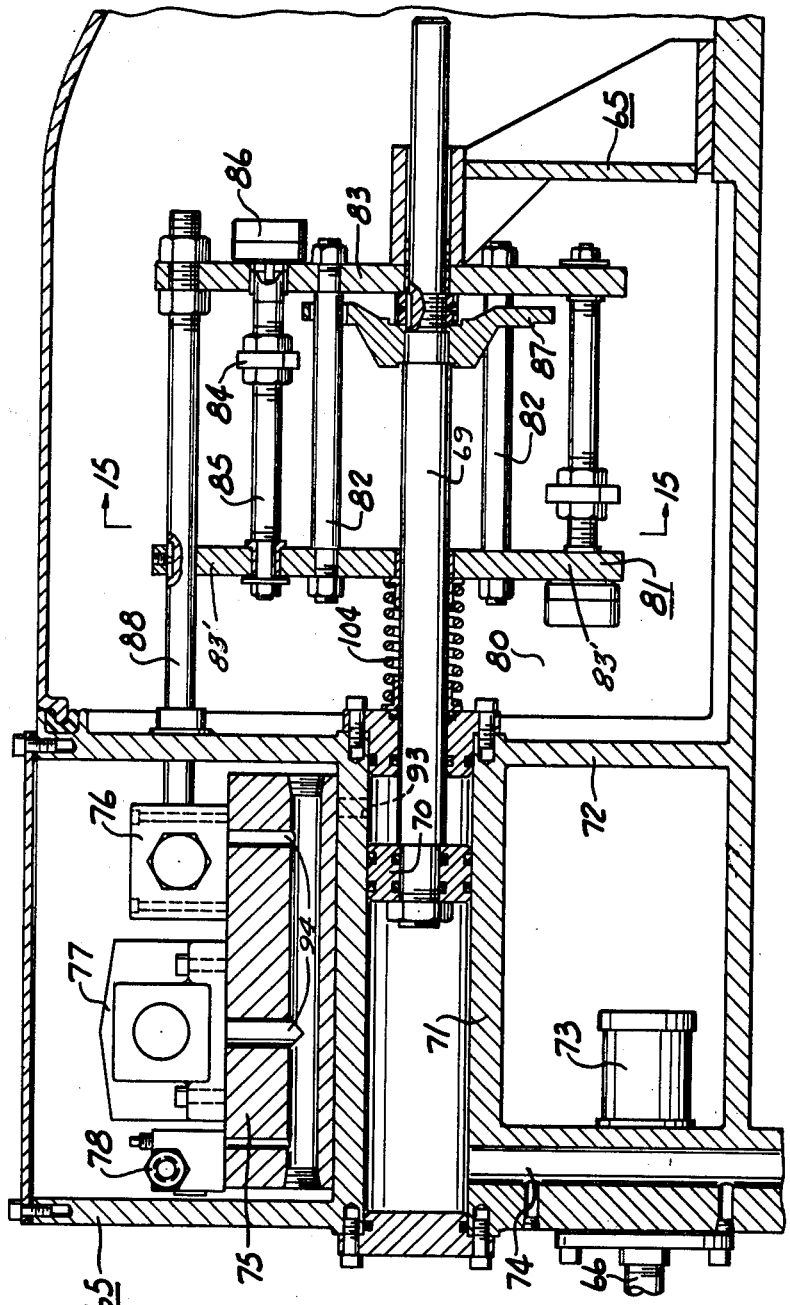

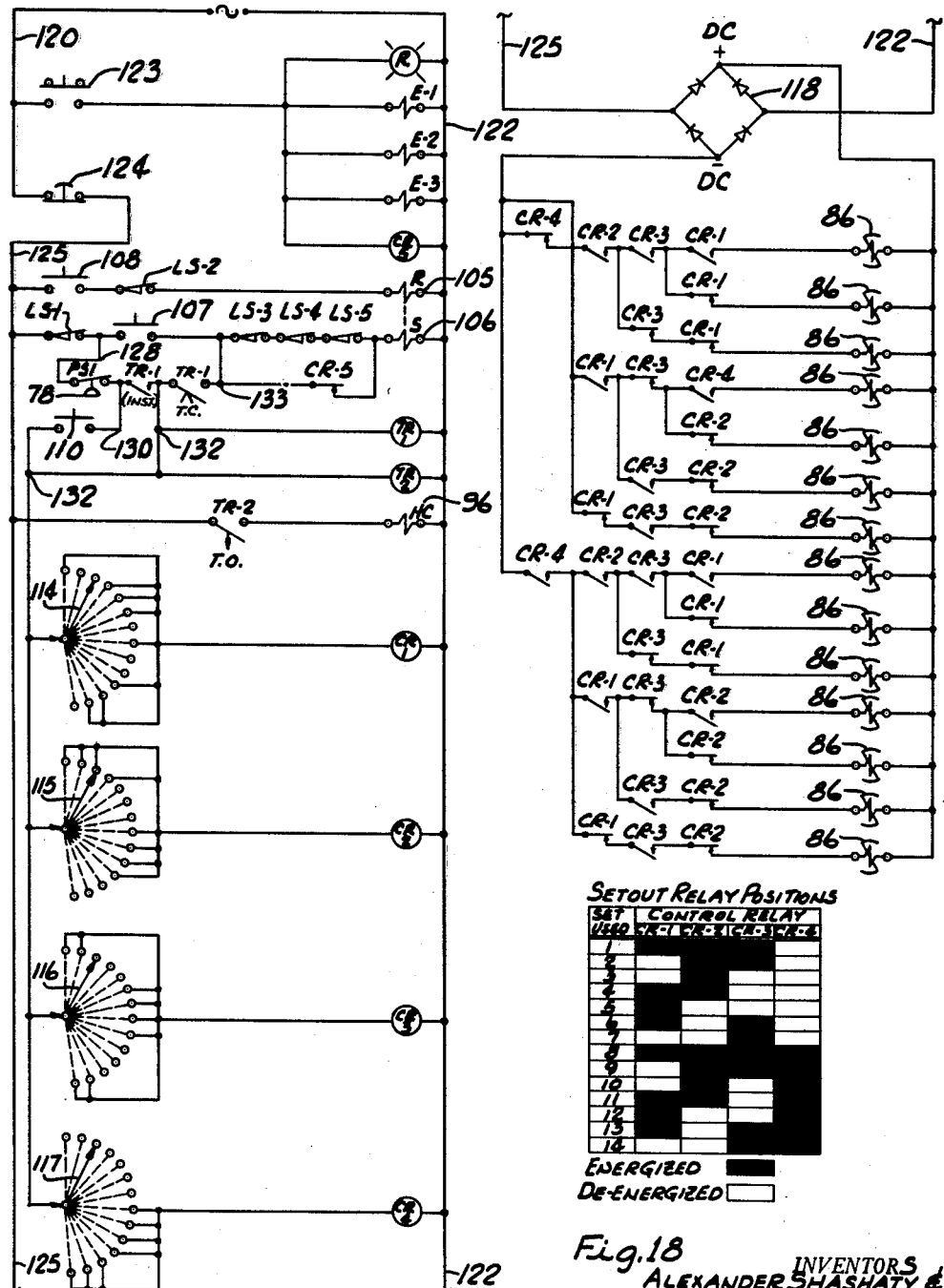

United States Patent Office 3,133,724
Patented May 19, 1964

3,133,724
SAW MILLS
Alexander Shashaty, Youngstown, and Clinton K. Browning, Columbiana, Ohio, assignors to Wm. K. Stamets Company, Pittsburgh, Pa., a corporation of Pennsylvania
Filed Jan. 23, 1961, Ser. No. 84,285
20 Claims. (Cl. 253—1)

This invention relates generally to saw mills and more particularly to the automatic control of the operation and feed of a log into a saw for the purpose of making cuts of selected thickness along the log in a series of cuts of similar or different thicknesses automatically.

The use of limit switches and combined clutch and brake mechanism in controlling the saw cuts of a mill has proved to be highly inaccurate and unreliable in maintaining accuracy in the thickness of the boards or slabs cut due to such feeding control which results in high waste and inadequate control of manual skill in sawing logs in a mill.

The present invention provides a servomotor in combination with electrical and fluid controls that are rigid and less costly than the present equipment yet are highly accurate in feeding the log to make uniform cuts of accurate dimension whether of repeated thickness or of variable thicknesses. The accuracy of this control on sawing wood is within a few thousandths of an inch which has not heretofore been possible.

Another object of this invention is the provision of a servomotor that is powerful but very accurate in feeding objects by steps at a work station such as a saw for repeated or different cuts that may be preselected.

Another object is the provision of a servomotor control that will slow down and cushion to accurately position and stop the measuring device to operate the indexing mechanism to within a few thousandths of an inch repeatedly or with varied predetermined degrees of measurements.

Another object is the provision of a hydraulic measuring cylinder that may feed a workpiece or a tool and preset increments that are accurate to within a few thousandths of an inch yet is powerful and sturdy and relatively inexpensive and fast in operation. The principal factor of this improved sevormotor resides in the fact that the valve and the actautor that operates the same are constructed to gradually reduce the operation of the valve as the setting of the index is approached. This reduces the flow of operating fluid and the movement of the servomotor piston until it reaches the exact position and then the fluid is shut off. This gradual approach to the exact position provides the accuracy of operation of the measuring cylinder as a servomotor. The measuring cylinder is operated by liquid from a hydraulic pump and the flow of liquid from the pump to the measuring cylinder is gradually cut off until the measuring cylinder has reached the exact position.

Another object is the provision of a follower which is coupled to the object to be indexed through a hydraulic or mechanical connection and both are driven simultaneously by the same power so that the distance traveled by the hydraulic cylinder and piston which when supplied with liquid from a pump will move the piston until a cam engaged by the piston shuts off the supply of liquid to the cylinder. If the cam shuts off this liquid supply gradually a gradual slowdown of the movement of the piston is effected until the valve is completely closed. The coupling of this follower or measuring device is made through a common shaft driving the hydraulic pump and the object to be controlled through a reduction gear but the movement of the object and the follower remains proportional. The control is preferably obtained by the use of an air motor which drives the common shaft. Thus when the pump is jammed by the closing of the valve the shaft is locked and the air motor cannot turn the same. The drive to the object may be locked mechanically through a worm drive in the reduction gear. The jammed pump actuates a pressure switch to stop the air motor and after a time delay open a circuit causing the liquid pressure to be exhausted to tank allowing the air pressure to return the measuring piston. When this indexing period has been used or finished the circuit may then be reenergized automatically or manually to again index the object in the same manner. When the total indexing steps have been completed the object may be retracted to its original position automatically or manually.

Another object is the provision of pivotally supported dogs for grasping and holding an object such as a log wherein the dogs when retracted recede from the operating area and when extended project into operating area which action is controlled by their pivotal connection and support together with a servomotor operated fixed throw crank to move the dogs from their retracted to their operating position.

Another object is the provision of pivotally connected and supported dogs which through one fluid actuated cylinder may be expanded and then brought together to engage and grip the object such as a log. This contemplates the pivotal connection between the opposing dogs and the knee and their relative sliding connections. These dogs are interconnected with toggles and links which when actuated cause the chiseled biting point of the upper dog to travel with relatively straight line motion to be most effective in cooperating with the lower dog to grip and hold the object at a great mechanical advantage.

Another object is the provision of a circular series of cams mounted on rotary shafts actuated by rotary electrical servomotors to pre-position them in the path of the measuring piston pickup plate which engages these cams to move the control carriage and actuate the deceleration and shut off valve operating the measuring piston to accurately control the movement of the piston and the object being operated. This contemplates a motor, mechanical, electrical or fluid type, the latter preferably being a pneumatic motor to drive the hydraulic pump that moves the measuring piston and simultaneously drives the object to be controlled, their movement being proportional to each other and preferably linear. Thus the cams although mounted in a circular series are adjustable at predetermined distances along the travel of the measuring piston to effect this control.

Another object is the provision of a cam surface for the hydraulic fluid from the pump to the cylinder. The motor or prime mover may be mechanical with a slip clutch or an electrical motor capable of stalling or with an electrical or hydraulic motor with a mechanical slip clutch but preferably a pneumatic motor which eliminates clutches.

Another object is the provision of a housing having cast therein a measuring cylinder and valve support which are vented to receive a manifold block carrying check and operating valves and pressure switch means within a chamber, the bottom of which functions as the tank for the hydraulic system. The control valve being actuated by the measuring piston provides a short coupling with no possible pipe vibration and any leakage would drain directly to tank.

Another object is the provision of an indicator to determine the ultimate limits of a movable object to be controlled and limit switches adjustable on the indicator to control the ultimate movement of the object without having such controls exposed to the hazards of the physical structure of the object where they may be accidentally destroyed through the operation of the machine.

Another object is the provision of an improved fluid and electrical circuits for controlling the movement of an object through the use of fluid circuits pre-set and checked by electrical circuits. This object contemplates the combination of a hydraulic and a pneumatic circuit to directly move and control the movement of the object. This control coupled with a measuring servomotor, preferably in the form of a hydraulic piston, accurately controls the exact movement of the object and electrical circuits prearrange what this movement is to be and the sequence of how and when it is to take place.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a front view in elevation of an automatic saw mill carriage.

FIG. 2 is a plan view of the saw mill carriage shown in FIG. 1.

FIG. 3 is an end view in elevation of the saw mill carriage shown in FIG. 1.

FIG. 4 is an enlarged sectional view of a knee on the log carriage.

FIG. 5 is an enlarged view in elevation of one side of a knee.

FIG. 6 is an enlarged end view in elevation of a knee.

FIG. 7 is a sectional view taken on line 7—7 of FIGS. 4 and 5.

FIG. 14 is a sectional view of the measuring cylinder and indexing cams.

FIG. 17 is a plan view of the control panel for the automatic saw mill.

FIG. 18 is a schematic view of the electrical control circuits for the automatic saw mill.

FIG. 19 is a diagrammatic view of a modified drive and hydraulic pump.

Figure 1:
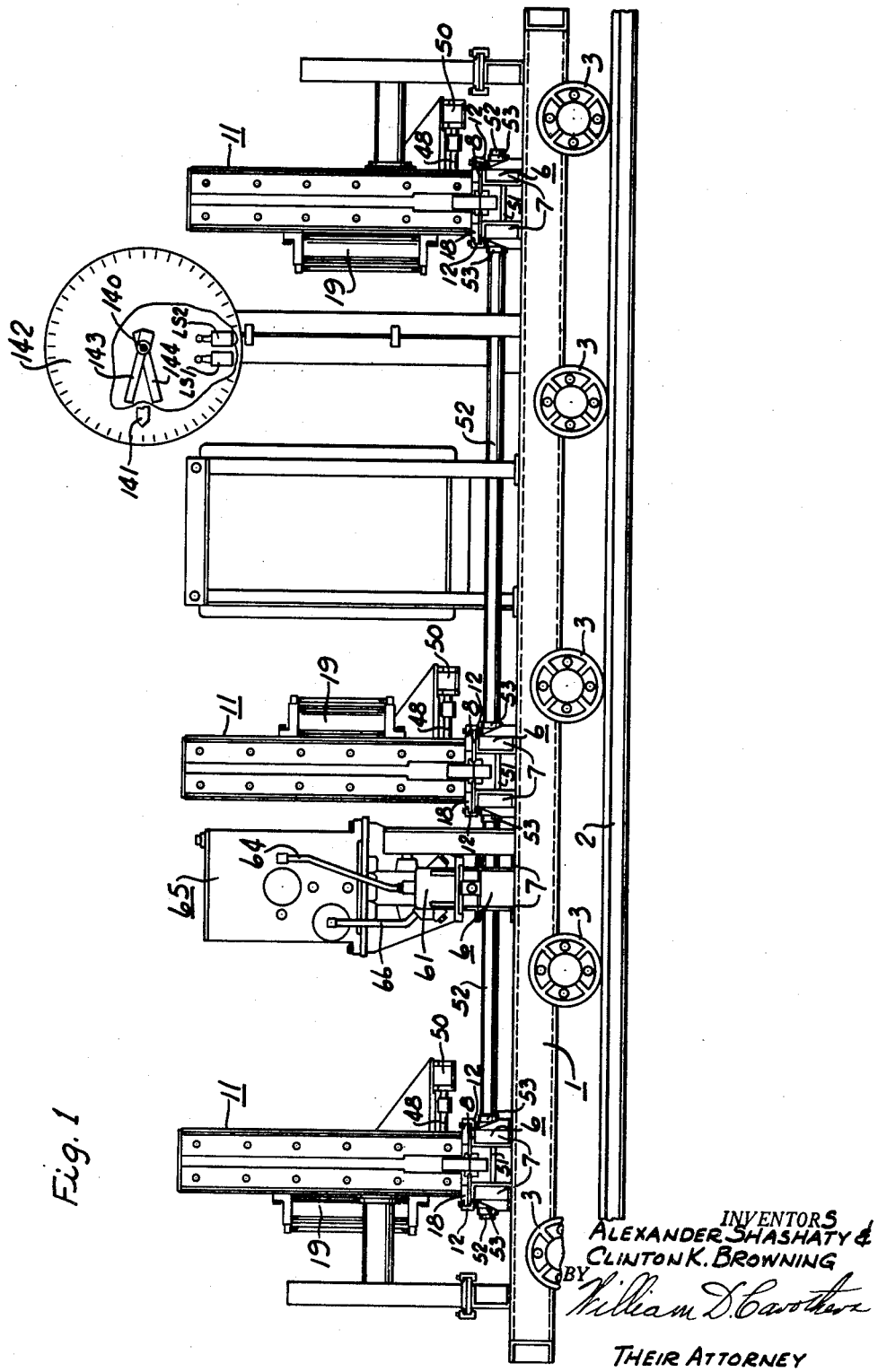
Figure 10:
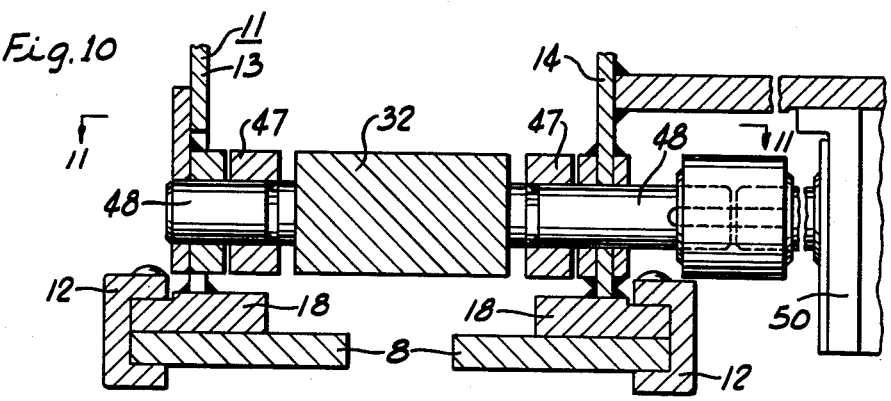
FIG. 10 is a sectional view taken on the line 10—10 of FIGS. 4 and 5.
Figure 9:
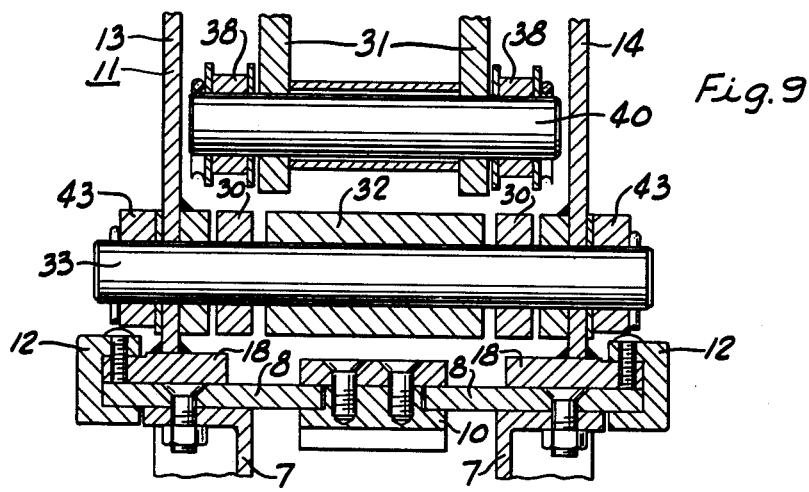
FIG. 9 is a sectional view taken on the line 9—9 of FIGS. 4 and 5.
Figure 8:
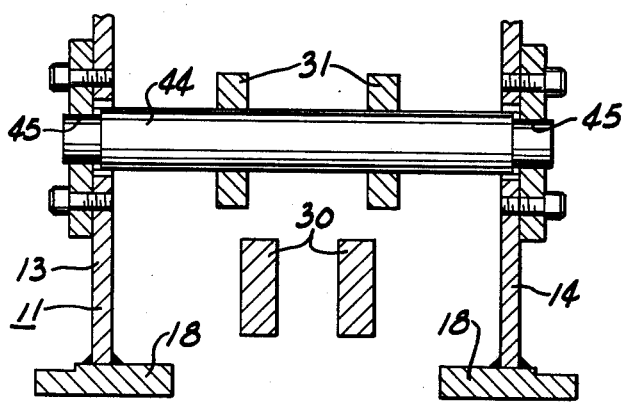
FIG. 8 is a sectional view taken on the line 8—8 of FIGS. 4 and 5.

The servomotor comprising this invention is best illustrated with a saw mill as it provides an ideal application for the use of a follower or measuring cylinder which through its measured movement controls the corresponding movement of the object. The movement of the follower and the object is retained proportionately as to speed and distance which in the case of saw mills provides a new and improved control not heretofore obtainable. Referring to FIGS. 1 to 3 of the drawings the saw mill illustrated is indicated by the carriage 1 movable longitudinally on the track 2 by means of the wheels 3 and 4 connected by the axles 5 journaled to the under side of the carriage. As in structures of this character the wheel 3 is flat and the wheel 4 is double-flanged and the rails of the track 2 are correspondingly shaped so that the carriage will maintain longitudinal movement along the track without lateral displacement. The power means to move the carriage is not illustrated.

Mounted on the carriage 1 is a set of three transverse head blocks 6 each spaced from each other. Each head block comprises a pair of spaced channel members 7 that extend over the full width of the carriage 1 and have mounted on their upper surfaces stationary track plates 8 which form retainers for supporting the rack member 10 and also serve as a wear plate for the logs resting on the surface thereof in front of the knee members 11. Thus each head block slidably supports its knee member 11 on the upper surface of the track members 8 and are held in sliding relation by the gib members 12. Each knee comprises side plates 13 and 14 which are secured to each other by the transverse plates 15 and 16 and the channel member 17. The bottom of the side plates 13 and 14 is provided with the slides 18 that rest directly on the tracks 8 and support the gibs 12 which slide back and forth with the knee. As best shown in FIGS. 3 and 4 each knee is movable relative to the rack member 10 by means of the cylinder 20 pivotally connected to the cross bracket 17 and its piston is connected through the pin 21 to the bell crank 22, its fulcrum being illustrated at 23 on the knee and its opposite end being pivotally connected by the pin 24 to the link 25. The opposite end of the link 25 is connected by the pin 26 to the rack retainer plate 27. It is secured relative to the rack. Thus when the cylinder 20 is extended or retracted the knee is moved relative to the rack. However, the cylinder 20 being a double acting cylinder locks the knee relative to the rack and causes the knee to move with the rack during the normal operation of the knees in sawing.

The cylinder 20 is provided with an air-oil pressure tank indicated at 19 and attached to either of the side plates of the knee as illustrated in FIG. 5.

When a log is placed on the wearing plates 8 in front of the knees which are retracted by means of the rack it is sometimes necessary to pre-position these knees so that the taper of the log is properly taken into account to avoid any waste in the cutting of the log. Thus each knee must be independently movable relative to its rack to compensate for taper or for any bend or surface misshape of the log. Once the knees are properly positioned relative to the racks to hold the log in the proper relation for the saw then the cylinders 20 with hydraulic fluid on one side and air on the other lock the knees relative to the rack with a two way valve so that the knees and rack will move as a unit member.

As shown in FIG. 4 each knee provides a lower dog 30 and an upper dog 31 which have upwardly and downwardly extending teeth for the purpose of grasping the log or object to be sawed. The lower dog extends rearwardly to a bifurcated section that is on the opposite sides of the locking link 32 being pivotally secured thereto by the pin 33. A block on the end of the piston 34 is also placed between the bifurcated section of the lower dog and is pivoted thereto by the pin 35. The piston 34 operates in the cylinder 36 which has oppositely extending pins 37 that are pivotally received in the bifurcated section of the upper dog member 31. If the cylinder 36 is expanded the pins 37 lift the upper dog member 31 to the position shown in dotted lines thereby opening the dogs. In order to provide the proper movement for the upper dog a toggle link 38 is pivotally secured to the upper dog by the pin 40 and its opposite end has the pin 41 that rides in the slot 42 of the plates 13 and 14 and the other end of the pin 41 is pivotally secured to one end of the tie link 43 which is outside of the knee plates 13 and 14 having its opposite end pivoted to the pin 33. The rear end of the upper dog 31 has the pin 44 attached thereto which slides longitudinally in the slots 45 of the side plates 13 and 14 of the knee. Thus by means of these toggle and tie links and slots the movement of the dogs in separating the coming together following substantially a straight line which slopes slightly outwardly as would be drawn from the position of the upper dog shown in dotted lines to the position shown in full lines.

As shown in FIG. 4 both dogs are extended in full lines.

The locking link 32 has fixedly secured thereto the pin member 46 which extends outwardly on both sides of the lock link and engages the crank arm 47, the rotary shaft of which is indicated at 48. The shaft 48 as shown in FIG. 1 extends outwardly to the side of the knee and is connected by a coupling to the shaft of the rotary air cylinder 50. Thus by energizing the rotary air cylinder in opposite directions one may throw the crank 47 and the link therewith to extend or retract the upper and lower dog members. In this way the dog members may be extended for operating on a lot or retracted for operating on a comb for sawing to the last one inch board. It will be noted that the point of the lower dog lies below the surface of the stationary track members 8 so as to be completely out of contact with the log resting on these wearing plates. Ordinarily the log is round and it would of course be free from contact of the upper dog 31. The rotary air cylinder 50 may be operated from a control stand and once the dogs are moved outwardly or inwardly the link 32 thus locks the position of the dogs in that it falls slightly below dead center of the pivotal connections.

Figure 12:
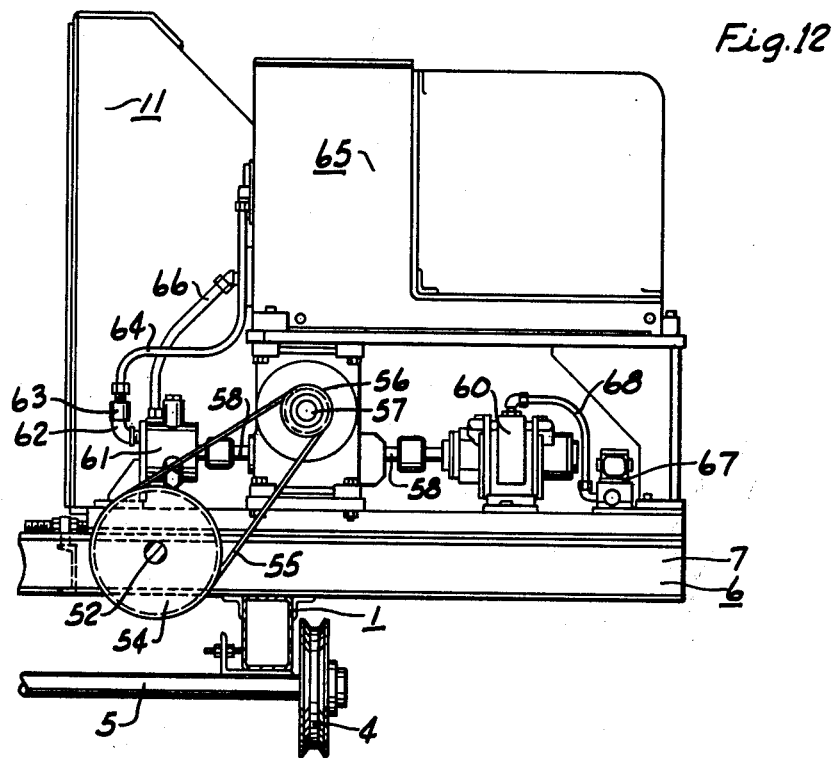
FIG. 12 is a view in side elevation showing the control and operating indexing mechanism for the automatic saw mill.
Figure 11:
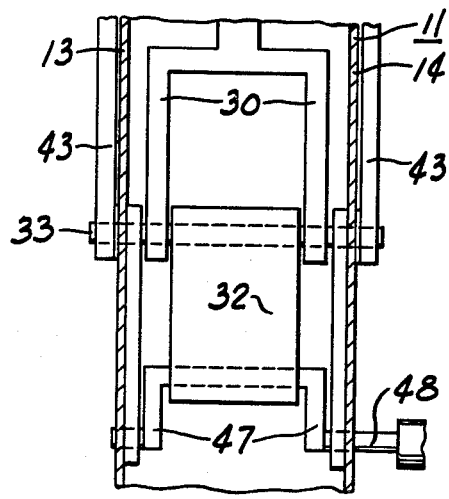
FIG. 11 is a sectional view taken on the line 11—11 of FIG. 10.

The rack 10 has its teeth on the under side thereof which engage with the pinion 51 found on the set shaft 52 that is journaled in the bearings 53 supported by each of the head blocks 6 as shown in FIGS. 1 and 2. As shown in FIG. 12 the set shaft 52 has mounted thereon the sprocket 54 which carries the chain 55 to engage the sprocket 56 on the output of the speed reducer shaft 57 which carries a worm gear connected with the worm on the power shaft 58.

Figure 13:
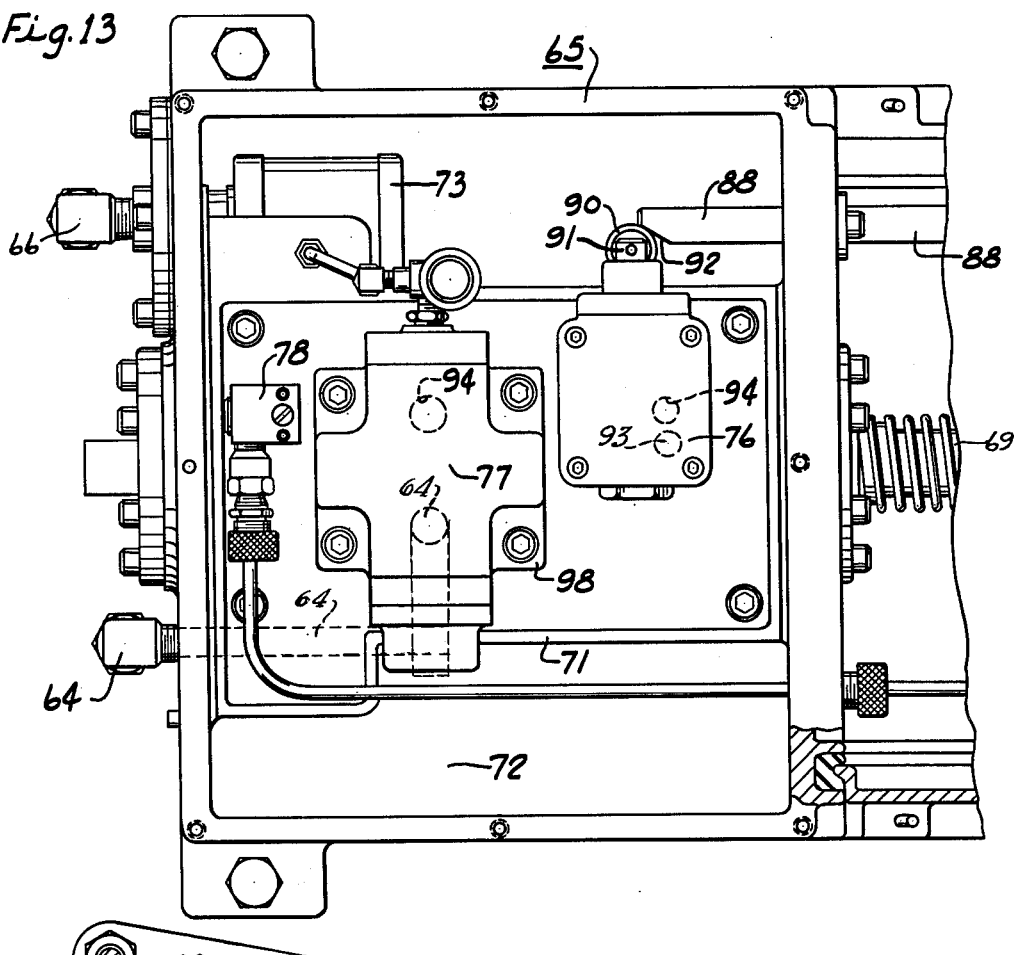
FIG. 13 is a plan view of the control and pre-set indexing mechanism with the case removed.

The power shaft 58 extends out of both sides of this speed reducer and is connected by couplings to the air motor 60 at one end and the hydraulic pump 61 at the opposite end. The hydraulic pump 61 is provided with an oil pressure side 62 that flows through the check valve 63 and the pressure line 64 to the servomotor measuring or flowing device enclosed in the housing 65 as shown and described with reference to FIGS. 13 and 14. As indicated in dotted lines in FIG. 13 the pressure line 64 is connected through the manifold block 75 to the four-way valve 77. The hydraulic return to the inlet of the pump passes through the line 66 to the pump 61. This pump should approximate 100% volumetric efficiency and a leakage would cause inaccuracy in positioning the knees.

The air motor 60 may be rotated in either direction and is controlled by the air valve 67 which has a multiplicity of lines indicated at 68, 69 to opposite sides of the air motor. By driving the air motor one operates the hydraulic pump 61 directly and also rotates the set shaft 52 to move the racks 10 in either direction depending upon the direction of rotation of the air motor 60 as controlled by the valve 67. Thus the air motor actually operates the knees 11 to move them outwardly on the heads 6 so as to move the log that the dogs hold into the proper sawing position and each index of movement of the knees outwardly as a group thus presents the log for cutting to remove increments of boards that may be anywhere from one-quarter of an inch thick to twelve quarters of an inch thick in increments of one-quarter inch, plus the saw kerf, or any other predetermined thickness. Thus we have the air motor driving the pump and also moving the knees in either direction and owing to the gear reduction the knees will move at a different speed relative to the pump but it will always be correlated or proportional. A positive drive exists from the shaft 58 to the pump 61 and the knees through the sprockets 54 and 56 and the chain 55 to the shaft 52, the pinion 51 to the rack 10, and the worm in the speed reducer 57 functions as a lock means in this drive connection between the pump 61 and the knees 11.

Figure 15:
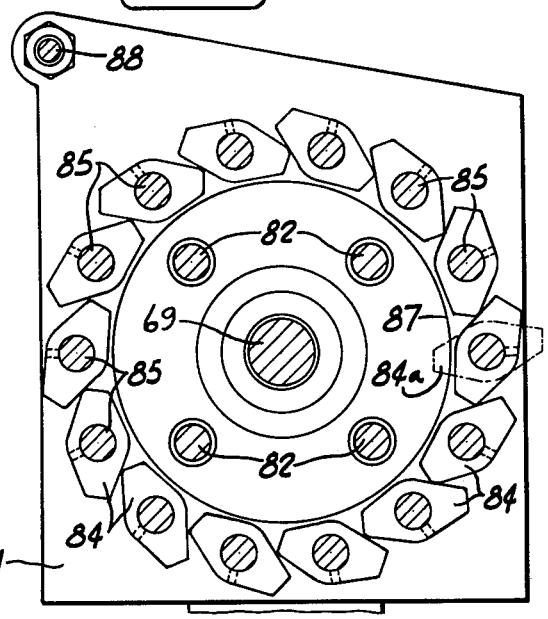
FIG. 15 is a sectional view taken on the line 15—15 of FIG. 14.
Figure 16:
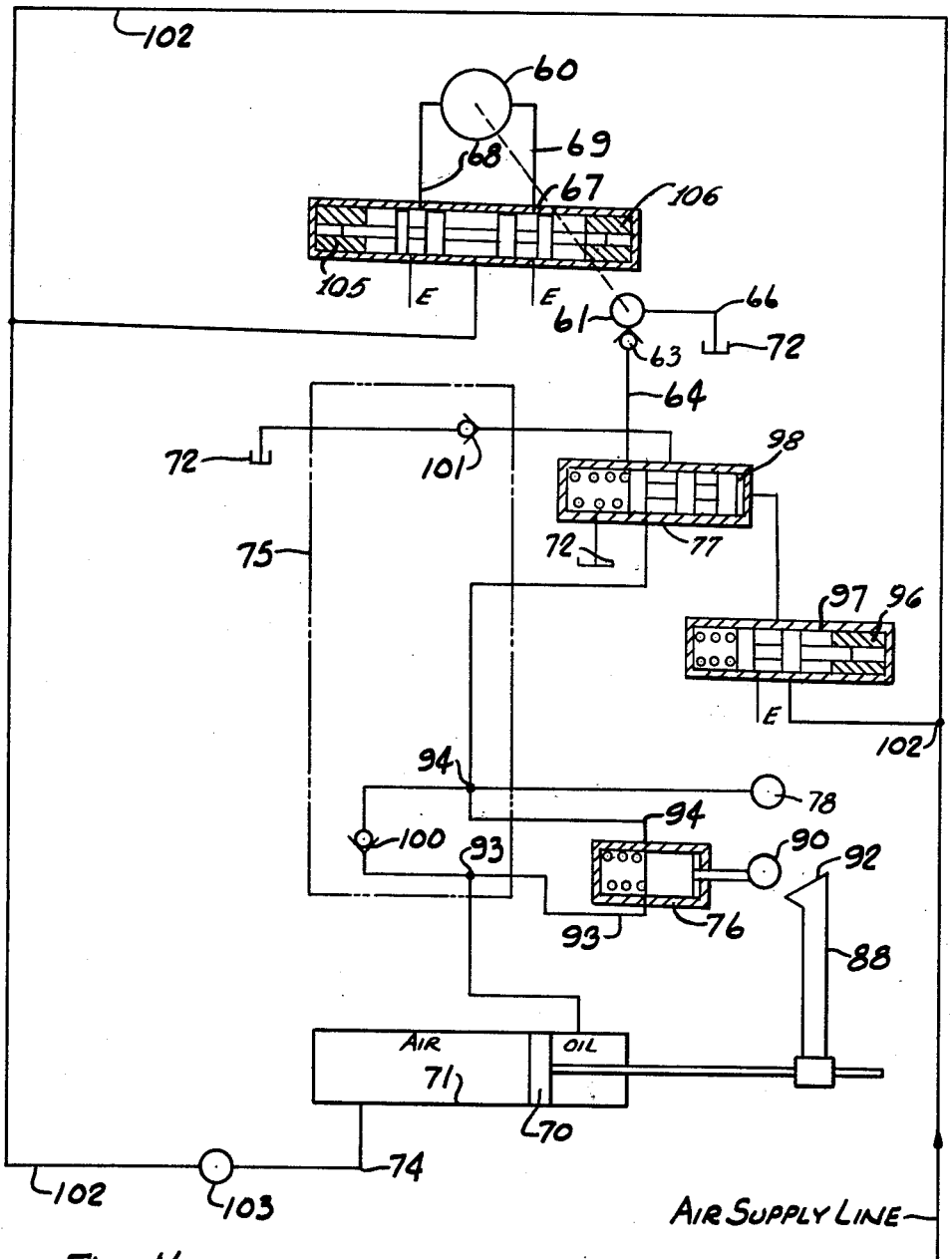
FIG. 16 is a schematic view of the fluid operating circuit.

The follower or measuring piston 70 operates within the cylinder 71 which is cast within the tank member 72 the lower portion being the tank reservoir and provided with an oil filter 73 to which the inlet 66 of the pump is connected. Air is connected constantly to the atmosphere through the inlet 74 to the opposite side of the piston 70 for returning the same because of the spring 104 when the oil or hydraulic liquid is permitted to exhaust on the opposite side of the measuring piston. The cylinder 71 together with the tank wall 72 is cast integral with the whole of the housing and the top surface of the cylinder 71 is provided with passages that mate with the manifold block 75 which provides all the connections for the control and reduction valve 76, the four-way valve 77 and the oil pressure switch 78. The piston 70 extends through a seal in the wall 72 and through a bearing in the outer wall of the housing 65. The chamber 80 contains the carriage member 81 formed by the spaced plates which are connected by the spacer bolt members 82. As illustrated in FIG. 15 each of the plates 83' and 83 forming the carriage 81 have suspended there between a series of cam members 84 adjustably mounted on the threaded bolts 85 which are in fact shafts rotatably mounted in bearings in the plates 83' and 83 by means of the rotary solenoids 86 mounted on the plate 83. The solenoids 86 rotate the cams 84 to place them in the path of the movement of the pickup plate member 87 which is locked to the rod of the piston 70. Thus when the cylinder 71 is energized to move the piston to the left in FIG. 14 the pickup plate engages a cam 84 in a carriage 81 which is movable on the cylinder rod of the piston 70 to the left and the deceleration valve trip actuating rod 88 secured to the carriage 81 passes through the wall of the tank 72 and engages the roller 90 shown in FIG. 13 which is on the actuating stem 91 of the deceleration valve 76. The end of the rod 88 is provided with a sloping cam surface 92 that engages the roller 90 so as to control upon the longitudinal movement of the rod 88 the operational movement of the actuating stem 91. This cam 92 thus slows the operation of the control member 91 of the valve 76 so as to reduce the flow of the hydraulic fluid from the pump to the cylinder 71 through the port 93 as shown in FIG. 14. This slows the movement of the piston 70 together with the operation of the pump 61. When the cam surface 92 completely closes the valve 76 the pump 61 is blocked and immediately arrests its movement together with the movement of the shaft 58 which also arrests the movement of the knees 11. Pressure immediately builds up in the line 94 as shown in FIG. 16 which causes the pressure switch 78 to operate which in turn deenergizes the solenoid 105 which after a time delay deenergizes solenoid 96 to operate the pilot valve 97 and reduce the pressure from the spring biased air operated valve 77 so that it returns to the position shown in FIG. 16 to relieve the pressure from the line 94 to the tank 72. The valve 98 also connects the hydraulic pump 61 to tank 72.

The manifold 75 also contains the check valve 100 that is in multiple with the valve 76 connecting the lines 93 to the lines 94 and when the valve 77 connects the line 94 to tank the check valve 100 releases the pressure from the right side of the measuring piston 70. In this position the liquid flows back through the line 94, the valve 77 through the check valve 101 to the tank 72. The check valve 101 is in the manifold block 75 whereas the check valve 100 is in that portion of the casing that forms the cylinder 71. Air is supplied through the line 102 to the valve 78 which when energized by the solenoid 96 functions as a pilot to operate the pilot 98 operating valve 77. The line 102 also passes through the regulator 103 and the air inlet 74 of the left side of the cylinder 71. It will be noted in FIG. 14 that the vertical portion of the air inlet 74 provides a sump which may be unloaded by the drain as shown and for the purpose of collecting any oil in the left side of the cylinder 71 which oil might possibly leak past the piston 70. Thus there is no opportunity for the oil to accumulate to any great extent in the air chamber of the cylinder 71. Since the air pressure is constantly supplied to the left side of the cylinder it will move the piston 70 to the right as shown in FIG. 14 allowing the liquid to exhaust through the check valve 100 as previously described. As the piston moves to the right the spring 104 between the tank 72 and the carriage 81 moves the carriage to the right and in position for the next indexing operation which will again energize the piston 70 to move it to the left and cause the pickup plate 87 to engage a selected cam 84. FIG. 16 also shows the rotary air motor 60 with the lines 68 connecting the opposite sides thereof for the purpose of rotating the motor in opposite directions. The valve 67 is actuated by two solenoids 105, 106 which merely reverse the flow of air to the line 68 supplying the motor 60. The solenoids 105, 106 are shown in the wiring diagram together with the solenoid 96 which operates the valve 97.

Referring to FIG. 15 which illustrates a cross section of the carriage 81 it will be noted that the multiplicity of shafts 85 are fourteen in number each of which is threaded to adjustably carry its cam 84. Thus with one setting of the control a selected cam as indicated by the number 84a may be rotated by its corresponding solenoid 86 to present itself in the path of the pickup plate 87 that is mounted on the piston rod. Thus the measuring piston 70 may be made to move from its initial position to one of fourteen precise locations determined by each of the cams 84 and each cam being effective to move the carriage 81 and the actuating rod 88 to operate the valve 76.

As shown in FIG. 17 the control panel is provided with a pair of operating switches such as the set out pushbutton 107 and the receding pushbutton 108 together with the pre-set pushbutton 110. The opposite side of the control panel has the pushbutton control for the tong dogs wherein the pushbutton 111 when depressed once will raise the dogs and depressed the second time will lower the dogs and the pushbutton 112 is also a step type control which in one depression moves the dogs out and the next depression retracts them. The center pushbutton 113 is a momentary type control to center knee tapers.

The center of the control panel is provided with the pre-set selector wherein each of the fourteen stations corresponds to each of the fourteen solenoids 86 and the indicator makes the selection of any one of these solenoids which is executed through a circuit such as shown in the circuit diagram FIG. 18.

This panel also provides an indicator light for the tong dogs together with an emergency stop pushbutton. The other pushbuttons represent the adjustment of the knees relative to their heads which compensates for the taper of the log relative to the knees. As shown the pushbutton No. 1 taper fwd. would be for energizing the cylinder 20 in the forward or receiving direction of the first knee.

The same is true for the third knee No. 3 taper fwd. on the opposite side of the panel. However, the middle or second knee has four controls, one for forward and one for receding the knee from the initial position. The second set of pushbuttons indicated by the back and center taper as indicated at 2a permits the knee to be drawn further to the rear.

As shown in FIG. 18 the circuit for operating this mechanism is divided into three sections, one for the control of the knees and the dogs which is not shown, the second for the control in pre-selecting the proper setting for the measuring piston to travel together with the third section which employs a set of four relays having their front and back contacts employed in combinatiion with each other for energizing each of the fourteen solenoids 86 as illustrated in the diagram showing the set out relay positions. The darkened areas indicate that the relay is energized and the white spaces indicate that their corresponding relays are deenergized. In this manner the indicator for the pre-set selector shown in FIG. 17 has in fact four operating arms 114, 115, 116, 117 for each of the relays CR1, CR2 and CR4 respectively. Thus by turning the knob the contact arms 114 to 117 either make or do not make a circuit to close the relays CR1 to CR4 in accordance with the tabulated set out relay positions which as illustrated in the line diagram determine the precise solenoid 86 that is to be selected. These solenoids are supplied with direct current from the bridge rectifier 118 and the corresponding contacts of the CR relays function in accordance with the indicators to make the selection and energize the chosen solenoid 86 which rotates the shaft 85 and set the cam 84 in the path of the pickup plate 87.

In the other portion of the circuit diagram the supply lines 120, 122 supply current to the pushbutton 123 marked tong or board dogs which pushbutton energizes each of the three air solenoids E1, E2 and E3 together with the CR5 relay. Each of these air solenoids are shown at the right of the pushbutton 123 on circuit. Diagram FIG. 18.

The current from the supply line 120 passes through the EM stop pushbutton 124 to the line 125 from whence current may be obtained by depressing the manual recede pushbutton 108 for the purpose of energizing the recede air solenoid R through the limit switch LS2 if the latter is closed. The limit switch LS2 is located on the indicator 134 shown in FIG. 3 wherein the set shaft 52 drives the sprocket 135 and the chain 136 to operate the sprocket 137 on the shaft 138 which carries a worm to drive a worm gear on the shaft 140 for the purpose of operating the indicator 141 on the face of the dial 142. The shaft 140 extends to the rear and is provided with the arms 143 and 144 which in turn engage the limit switches LS1 and LS2 respectively as indicated in FIGS. 1 and 3. Thus the arms 143 and 144 function to engage the limit switches at the end of travel of the knees moving back and forth on the heads.

The line 125 also supplies current through the limit switch LS1, the manual set out pushbutton 107, the normally closed contact of the CR5 relay to the set out air solenoid S. This air solenoid is also energized by the pushbutton 107 by the line connecting through the limit switches LS3, LS4 and LS5 to the set out air solenoid S.

The limit switch LS1 also supplies current to the line 128 from which current passes through the pressure switch 78 to the line 130 and the pre-set pushbutton 110 thus energizes the line 132 to supply current to the TR1 and TR2 relays. The TR1 relay is a time closing relay that is a time delay in closing this relay whereas TR2 is a time delay opening relay. As soon as relay TR2 which closes immediately makes its circuit current pass from the line 125 through the front contact of the TR2 relay to the pilot solenoid HS which is solenoid 96 as shown on FIG. 16 for operating the valve 97.

At the same time the one contact from the TR1 relay close the circuit from line 130 to line 132 thus bypassing the pre-set pushbutton 110 and after time delay supply current to the line 133 which energizes the air solenoid valve S either through the limit switches LS3, LS4, LS5 or the CR5 back contact in multiple with the limit switches.

Also upon energizing the line 132 each of the arms 114 to 117 of the pre-selector switch are energized and in accordance with the fourteen positions of each of these arms the four CR relays are selectively energized in accordance with the tabulation to pre-select the specific solenoid 86 in accordance with this tabulation. Thus the machine is placed in operation with the air motor 60 being energized to rotate the shaft 58 and the hydraulic pump 61 together with the set shaft 52 to pre-position the knees 11, the measuring piston 70 being moved at the same time in proportion to the movement of the shaft 52 until the pickup plate engages the pre-selected cam 84 placed in the path of the plate by its corresponding solenoid 86 to move the rod 88 and permit its cam surface 92 to engage the operating mechanism of the deceleration and stopping valve 76 which action slows down the movement of the measuring piston 70 and stops it at the precise location which insofar as the shaft 52 is concerned is a precise location of the knees 11.

As soon as the piston 70 is stopped by the valve 76 pressure from the pump 61 builds up pressure in the system to actuate the pressure switch 78 which is noted as 78 and PS1 on the circuit diagram immediately opens the circuit to the set out air solenoid S, the TR1 and TR2 relays and to the selection switch arms 114 to 117 inclusive. However, the pilot solenoid HC is also deenergized by the opening of the TR2 relay after a specific time delay.

In the modification shown in FIG. 19 the knee 11 is slidable along the headblock 6 made up of the channels mounted on the carriage 1. In this modification the air motor drive 60 for positioning the knees is accomplished through the air motor 150 in the form of a double acting air cylinder 151 containing the piston 152 with its piston rod 153 directly connected to the knee 11 and having air connections 68 and 69 at its opposite ends for receiving the air supply from the valve 67 shown in FIG. 16. The measuring motor is supplied with hydraulic fluid from the hydraulic pump 154 and as before is driven at the same time as the knee and by the air motor. In this modification the pump 154 is also hydraulic but is in the form of the cylinder 154 containing the piston 155 and its piston rod 156 is directly connected to one knee 11 so that it is driven by the air motor 150. All other knees 11 are inter-connected through the shaft 52 as before. One end of the hydraulic pump or cylinder 154 is connected by the line 66 to tank whereas the other end is connected to the pressure side 62 thence to the check valve 63. The connections are the same as that shown in FIG. 16. The types of motors 60 and 61 have just been changed to cylinder type as shown in FIG. 19. The leakage in a cylinder type motor 154 is practically nil. Thus, the volumetric efficiency is practically 100% and no errors occur in positioning. The volumetric efficiency of the rotary type pump 61 is very good and any slight leakage does not produce an accumulative error.

We claim:

1. A fluid servomotor control comprising an object to be controlled in predetermined movements, a drive motor, a drive connecting said drive motor to said object to move the latter, a hydraulic pump coupled with said drive to operate said pump simultaneously with said drive in driving said object, a hydraulic measuring motor, a connection to supply the total output of said pump to said measuring motor, said drive constructed to correlate the movement of said pump and said measuring motor with the movement of said object, a valve in said connection, and trip means actuated by said measuring motor and connected to close said valve and stall said pump and stop said drive motor at a predetermined position of said object.

2. The servomotor control of claim 1 characterized in that said drive from said drive motor to said object is a positive connection for both forward and reverse movement.

3. The servomotor control of claim 1 characterized by lock means in said drive connecting said drive motor to said object.

4. The servomotor control of claim 1 characterized in that said trip means includes a valve operating means mounted to operate said valve in said connection between said pump and said measuring motor, valve actuating means operated by the movement of said measuring motor to close said valve and stall said pump, and pressure responsive means in said connection to interrupt the power supplied to said stalled drive motor.

5. The servomotor control of claim 1 characterized in that said valve has a bias means to return the same to its open position and release the fluid pressure when said measuring motor is deenergized.

6. The servomotor control of claim 5 characterized in that said bias means of said valve has a spring to return the same to its open position when said measuring motor is deenergized.

7. The servomotor control of claim 5 characterized in that said bias means of said valve has an air pressure to return the same to its open position when said measuring motor is deenergized.

8. The servomotor control of claim 1 characterized by a switch means including a second valve in said connection interposed between said first valve with said pressure responsive means and said pump, and circuit means actuated by said second valve to alternately control the supply of tank or hydraulic pressure through said first valve to the measuring motor side of said connection.

9. The servomotor control of claim 8 characterized in that said circuit means includes a pneumatic actuator for said second valve and a solenoid actuated pneumatic valve for operating said pneumatic actuator.

10. The servomotor control of claim 9 characterized in that said drive motor is a pneumatic motor, a reversing pneumatic valve for controlling the operation of said pneumatic motor, a forward and a reverse solenoid for said pneumatic valve, and electrical circuit means to alternately energize said solenoids.

11. The servomotor control of claim 10 characterized in that said electric circuit means includes a manual recede pushbutton to operate said reverse solenoid, a manual and preset pushbutton to operate said forward solenoid, and a contact actuated by said measuring motor to interrupt the circuit to said preset pushbutton when said measuring motor is extended to its preset position.

12. The servomotor control of claim 11 characterized in that said electric circuit means includes a pair of limit switches in the circuit of said manual recede and manual preset pushbuttons to open said circuits when said object is at its ultimate position opposite to that control of said pushbutton.

13. The servomotor control of claim 12 characterized in that said preset pushbutton circuit includes a relay having normally open first quick opening and closing contact and a second normally open time delay in closing quick opening contact, and a second relay having a quick closing with a time delay in opening contact, said electric circuit including said first contact closing a holding circuit parallel with said preset pushbutton to maintain said first and second relays energized, said second contact energizing said forward solenoid, and said contact of said second relay energizing said solenoid of said solenoid actuated pneumatic valve to operate said second valve before said forward solenoid is energized.

14. The servomotor control of claim 11 characterized in that said circuit energized by said preset pushbutton also includes a plurality of selector relays and a plurality of gang connected moving contacts in a plurality of multiple position selector switches each of which has a selective number of contacts controlling one selector relay, each selector relay having a combination of normally open and normally closed contacts, a plurality of rotary solenoids, the contacts of said selector relays selectively connected to energize and deenergize their respective selector relays in combination to energize a specific rotary solenoid when the rotary solenoids are more than the square in number than the selector relays.

15. The servomotor control of claim 14 characterized by a carriage, a valve actuating means mounted adjacent said carriage, a plurality of cams one for each rotary solenoid mounted on said carriage adjacent said valve actuating means to be extended in the path of the latter when extended by its corresponding rotary solenoid, said carriage operating said valve when a selected cam is engaged by said valve actuating means on said measuring motor.

16. The structure of claim 15 characterized in that said valve actuating means is a disc on a reciprocal rod, and said carriage is frame slidable on said rod, and said cams are fingers adjustably mounted longitudinally on independent shafts rotatably mounted in said frame, each rotary solenoid operating one shaft to extend its finger into the path of said valve actuating means.

17. The servomotor control of claim 8 characterized in that the control through said first valve has a check valve in multiple therewith for discharging the hydraulic pressure from said measuring cylinder to tank.

18. The servomotor control of claim 17 characterized by a check valve between said second valve and tank for said pump circuit and said measuring cylinder.

19. A measuring motor comprising a casing containing a cylinder, a spring-loaded piston in said cylinder, a port adjacent one end of said cylinder to supply and exhaust fluid to and from said cylinder, a port at the other end of said cylinder being continuously open to atmosphere, a manifold block above said cylinder, two independent valves mounted on said manifold block and connections between said valves to pressure and tank for operating said piston, one of said valves connecting pressure and tank for operating said piston and the other of said valves actuated by said piston to close the connection of said piston to said first valve.

20. A measuring motor comprising a cylinder, a piston operating in said cylinder, a port connected to said cylinder, a pickup plate attached to said piston, a pair of spaced plates slidably mounted on said piston and secured relative to each other to form a carriage, an annular series of shafts journaled in said plates parallel with said piston, a rotary servomotor for each shaft, a finger on each shaft to be selectively inserted or withdrawn from the path of said pickup plate, an operating rod secured to said carriage, and a valve actuated by said operating rod for controlling said port to block the flow of fluid to said cylinder.

References Cited in the file of this patent
UNITED STATES PATENTS

| | | |
|---|---|---|
| 1,466,342 | Rhodes | Aug. 28, 1923 |
| 2,543,759 | Cannon et al. | Mar. 6, 1951 |
| 2,716,395 | Pettigrew et al. | Aug. 30, 1955 |
| 2,908,252 | Schuman | Oct. 13, 1959 |
| 2,988,056 | Rumsey | June 13, 1961 |
| 3,000,362 | McCurdy | Sept. 19, 1961 |
| 3,004,525 | Emain | Oct. 17, 1961 |
| 3,016,804 | Zankl et al. | Jan. 16, 1962 |